United States Patent [19]

Thomson

[11] Patent Number: 4,484,076
[45] Date of Patent: Nov. 20, 1984

[54] DIRECT READING DOSIMETER
[75] Inventor: Ian Thomson, Nepean, Canada
[73] Assignee: Canadian Astronautics Limited, Ottawa, Canada
[21] Appl. No.: 321,081
[22] Filed: Nov. 13, 1981
[30] Foreign Application Priority Data
  Oct. 2, 1981 [CA] Canada ................................. 387222
[51] Int. Cl.³ ............................................. G01T 1/24
[52] U.S. Cl. ................................................. 250/370
[58] Field of Search ................... 357/29; 250/370, 371, 250/388

[56] References Cited
U.S. PATENT DOCUMENTS
  4,320,393 3/1982 Engdahl ............................. 250/388

OTHER PUBLICATIONS

Ciarlo, "MOSFET Detector Evaluation", IEEE Trans. Nucl. Sci., 21 (1), 2-74, pp. 390-394.
Kalibjian, "Time-Resolved X-Ray Detection Using MOS-C Detectors", IEEE Trans. Nucl. Sci., 19 (3), 6-72, pp. 339-345.
August, "Estimating and Reducing Errors in MOS Dosimeters Caused by Exposure to Different Radiations", IEEE Trans. Nucl. Sci., 29 (6), 12-82, pp. 2000-2003.
Adams, "The Development of an MOS Dosimetry Unit for Use in Space", IEEE Trans. Nucl. Sci., 25 (6), 12-78, pp. 1607-1612.

Primary Examiner—Alfred E. Smith
Assistant Examiner—Carolyn E. Fields
Attorney, Agent, or Firm—Edward E. Pascal

[57] ABSTRACT

A direct reading dosimeter having a range such that it can be used by personnel workers in the medical, nuclear and industrial fields, and provides and indication of dose rate as well as total received dosage. The dosimeter uses a semiconductor sensor of MOS or bipolar transistor or MOS capacitor form which traps positive charge under the influence of ionizing radiation. A current is applied to the sensor substrate, the voltage across a portion of the substrate is sensed, differentiated and displayed. The dosimeter circuit can be integrated and packaged in a wrist watchcase, in a probe, or other convenient form.

24 Claims, 14 Drawing Figures

DIRECT READING DOSIMETER

This invention relates to the field of radiation detection instruments, and particularly to a direct reading dosimeter.

BACKGROUND OF THE INVENTION

Ionizing radiation in the form of x-rays, gamma rays, high energy electrons etc. is extensively found in the medical and nuclear fields, and are often found in various industrial fields. For example gamma rays from $Co^{60}$ radio therapy machines are utilized to expose medical patients during radiation treatment. Medical instruments are irradiated for sterilization, and certain plastics are irradiated to polymerize them. Workers involved in the generation of electricity in nuclear reactors or involved in the transfer of radio isotopes from a manufacturer to a customer are often exposed to radiation. In outer space, astronauts, electronic and other equipment are exposed to radiation.

It is clearly desirable to be able to measure the amount of radiation to which personnel, materials or structures are exposed. It is also highly desirable to be able to measure the radiation rate, i.e., the intensity of radiation, in addition to the total radiation dosage incurred.

There are presently three radiation dose monitoring techniques in general use: (a) thermoluminescent devices, (b) air ionization chambers, and (c) geiger counters. Both air ionization chambers and geiger counters measure dose rates (in some cases having an alarm threshold), but are large and bulky and require a high voltage supply, thus making them undesirable and impractical for use as direct reading dosimeters. In addition, their detection ranges are far above ranges useful for personnel, and insufficiently accurate for the same application. Consequently personnel dose measurement has fallen to thermal luminescent devices. Such devices utilize a small crystal of LiF or $CaF_2$ which traps the electrons and holes produced by the ionizing radiation. When heated, light is emitted from the crystal due to the emptying of the traps and this light is related to the accumulated dose. Such devices give post-facto radiation measurements, and do not provide a warning threshold indication. Indeed, a person may exceed a safe dose substantially by the time his dosimeter is measured. Further, the dose rate at any given time cannot be indicated.

The present invention is a direct reading dosimeter which is light, sufficiently small to be able to worn on a person, and measures both dose rates and total dose. A dose rate or total dose threshold can be set whereby an alarm is sounded when any of the selected threshold is exceeded. Since either the dose rate or the total dose can be read out directly and immediately by the user, sudden increases or excessive radiation can be immediately responded to, the wearer retreating to a safe physical location. The measurement range has been found to include the range of most interest to personnel which might be exposed to radiation, such as workers in the medical, nuclear and industrial fields. Such irradiation is typically in the range of 0.01 to 10 cumulative rads.

DESCRIPTION OF THE PRIOR ART

The present invention is based on a semiconductor sensor. It is known that MOS devices such as transistors or capacitors will trap positive charge. For example, in IEEE Transactions on Nuclear Science, Volume NS-25, No. 6, December 1978, entitled THE DEVELOPMENT OF AN MOS DOSIMETRIC UNIT FOR USE IN SPACE, by Leonard Adams and Andrew Holmes-Siedle, a structure is described which can be used to measure total irradiation dose by measuring the threshold voltage of the semiconductor device. In this case, a constant current is fed to the source-drain circuit of an MOS transistor, and the current is amplified in an NPN bipolar transistor. The gate is grounded. The output voltage of the transistor is related to the threshold voltage of the MOS transistor. As positive charge accumulates under the gate, the threshold changes, and a reading of the threshold voltage provides an indication of the cumulative dose. A depth dose unit was designed using this structure by multiplexing a plurality of units, each of the units being shielded by different thickness of aluminum.

The authors indicate that the volume of the device which collects positive charge is so small, that it is possible, but rarely practical, to measure dose rates. The technique suggested for measuring such rates is by means of an ionization current measurement.

SUMMARY OF THE INVENTION

According to the present invention, however, a dose rate measurement is made directly. Ionization current measurement is not required. In the present invention, however, the gate threshold voltage change, rather than absolute value is measured and displayed as a direct reading of the dose rate. This is effected by continuously switching the gate of an MOS transistor from positive bias to negative bias, by the use of a bias and sense circuit which offsets any gate voltage and amplifies the gate threshold voltage change. The output can be of a form suitable to directly drive a digital readout (e.g. a liquid crystal display or visible LED display) or a simple analog voltage which can trigger a visible and/or audible alarm. Since the positive charge accumulated by the sensor is cumulative, eventually the sensor must be replaced. However the sensor can be incorporated in the dosimeter housing, e.g. a wrist watch case which is worn similar to a wrist watch, at the tip of a probe at the end of a cable, etc.

The sensor device can be a MOSFET, bipolar transistor or MOSFET capacitor which has its electrical characteristics change due to the trapped charge in the insulating layer of the device. A P channel MOSFET is preferred due to its controlled linear response to radiation. Where a capacitor is used as the probe, capacitance change is measured, and in a bipolar transistor, a decrease in the DC current gain $h_{FE}$ with radiation dose is measured.

In general, the invention is a direct reading dosimeter comprising a semiconductor sensor including a semiconductor substrate, an insulating layer defining a predetermined area disposed over the substrate for trapping positive charge under the influence of ionizing radiation, a circuit for applying current to the substrate, a circuit for sensing the voltage across a portion of the substrate underlying the insulating layer, a circuit for differentiating the sensed voltage, and a display for displaying the differentiated voltage as a dose rate.

According to one form of the invention, the sensor is an MOS device, including a source, drain and gate, the gate being insulated by an insulating layer of a kind which traps positive charge under the influence of ionizing radition and further includes a circuit for applying a constant current through the source-drain circuit of the transistor, a circuit for switching the gate between a source of positive and negative bias sufficient to turn the source-drain current off and on, a circuit for detecting a voltage across the source and drain, and an indicator for indicating the detected voltage.

According to another form of the invention, the sensor is a bipolar transistor having a collector, emitter and base, and further includes a circuit for applying a constant current to the base, a load connected in an emitter-collector circuit of the transistor, a circuit for applying current through the emitter-collector circuit, a circuit for detecting the voltage across the load to provide an output signal, and an indicator for indicating the output signal.

According to another embodiment of the bipolar transistor sensor dosimeter, the detecting circuit detects either the current through the emitter-collector circuit or the voltage across the load to provide the output signal.

According to a further embodiment of the bipolar transistor sensor dosimeter, the load is connected to the emitter, and the constant current is applied to the collector-emitter circuit. A direct current is applied to the base-emitter circuit. The detecting circuit detects either the base current, load current or load voltage to provide the output signal.

According to another form of the invention, the semiconductor sensor is an MOS capacitor, including a substrate, an insulating layer disposed over the substrate, and a conductive layer disposed over the insulating layer. A bias voltage is applied across the capacitor, and a high frequency signal is applied through a load across the capacitor. A detecting circuit detects the voltage across the capacitor during or following irradiation of the capacitor by ionizing radiation, and an indicator indicates the detected voltage.

In each case detected voltage is of course displayed on a display, which is calibrated to provide an indication of rads per unit time, or total rads. It is preferred that a switch should be provided on the dosimeter to allow reading of either dose rate or total dosage on the display. A threshold device also can be utilized to cause an indicator such as an acoustic alarm to sound, should a predetermined and manually variable dose rate or total dose threshold be exceeded. Clearly the present invention is a useful, necessary and long sought device which, it is believed, will be widely applied.

BRIEF INTRODUCTION TO THE DRAWINGS

A better understanding of the invention will be obtained by reference to the detailed descripiton of the invention below, and to the following drawings, in which.

DETAILED DESCRIPTION OF THE INVENTION

Figures 1A, 1B, 2A, 2B, 4:
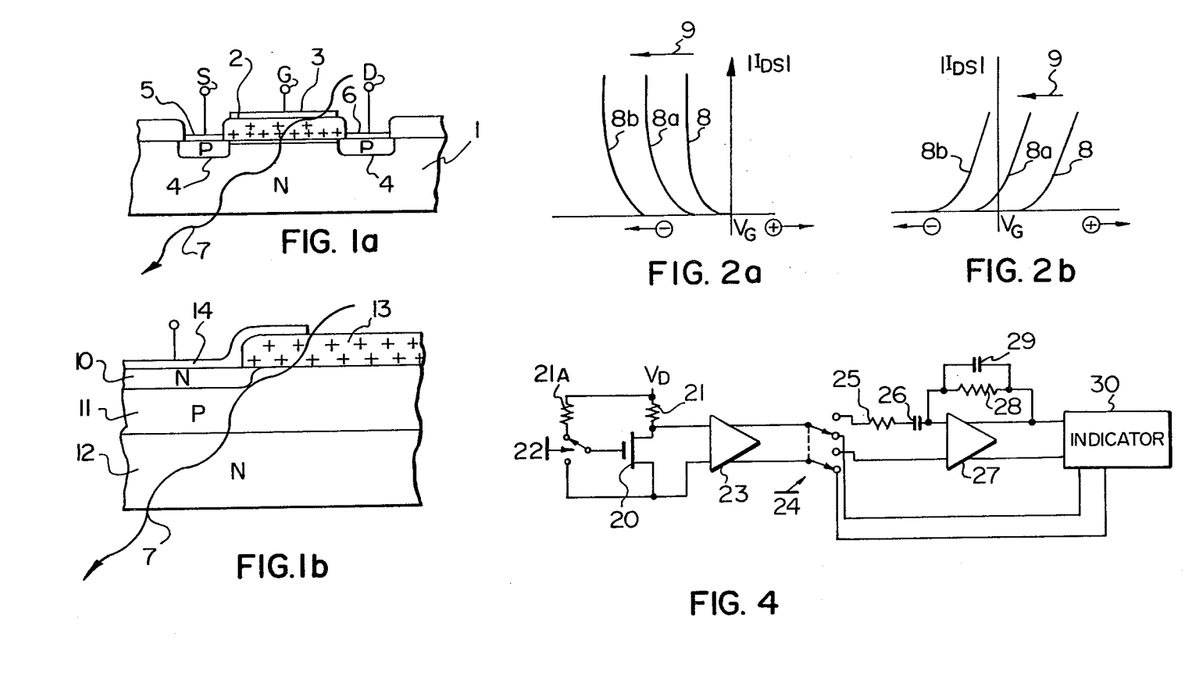
FIG. 1A is a cross-section of an MOS transistor sensor.
FIG. 1B is a cross-section of a portion of a bipolar transistor sensor.
FIG. 2A is a graph showing the characteristics of the threshold voltage and the source-drain current of a P channel MOS transistor under the influence of ionizing radiation.
FIG. 2B is a graph of the characteristics of the threshold voltage and the drain-source current of a N channel MOS transistor under the influence of ionizing radiation.
FIG. 4 is a simplified schematic diagram of one embodiment of the invention.

Turning to FIG. 1A, a section of a representative MOS device is shown, in the form of a field effect transistor. The device includes a substrate 1, on which an insulating layer 2 is disposed over a predetermined area, over which is disposed a conductive layer 3. A gate terminal G is connected to the conductive layer.

A pair of wells 4 of opposite polarity type to the substrate 1 are located on opposite sides of the insulating layer 2. A pair of conductive layers 5 and 6 contact the upper surface of the wells, and are respectively connected to a source electrode S and drain electrode D terminals. The same device without the wells, source and drain electrodes, would form a capacitor.

In either case, ionizing radiation represented by the arrow 7 penetrates the device, creates hole-electron pairs in the insulating layer, and a fraction of the holes are trapped therein (electrons being more mobile, can more easily escape). A positive charge builds up and it becomes increasingly difficult for a P channel MOSFET to be turned on and an N channel MOSFET to be turned off. FIG. 2A represents the device characteristics of a P channel MOSFET, and FIG. 2B represents the device characteristics of an N channel MOSFET.

For a device which has no positive charge trapped in the insulating layer, the threshold voltage versus drain-source current characteristic is similar to curve 8. As the radiation increases, the curve 8 gradually shifts to the left as represented by arrow 9, i.e., first reaching curve 8A, and then reaching curve 8B. Clearly for the P channel device (FIG. 2A) as the radiation increases, the threshold voltage gradually shifts to a more negative value, and a larger negative gate to source voltage is required to turn it on. In an N channel device, the gate to source threshold voltage decreases from a positive value, requiring a more negative voltage to turn the device off.

It is more important, however, to note that there is a shift in the threshold voltage characteristic as the radiation dose increases, which appears to be due to the accumulation of trapped positive charge in the insulator under the gate, or, in the insulator between the electrodes in an MOS capacitor.

Where charge is trapped between the plates of an MOS capacitor, a change in capacitance occurs with increase in trapped positive charge.

FIG. 1B is a section of a bipolar transistor, in which a similar effect is observed. In the device which is shown, an N well 10 is located in a P epilayer 11 on an N substrate 12. An insulating field oxide layer 13 is located on the epilayer around the periphery of the N well. A conductive layer 14 is in contact with the upper surface of the N layer 10, and also overlays the insulating layer 13.

When ionizing radiation shown by arrow 7 penetrates the insulating layer 13, a positive charge is trapped in a manner similar to that described earlier with reference to FIG. 1A. A decrease in the DC current gain $h_{FE}$ with increased radiation dose is observed.

Figures 3, 6, 7:
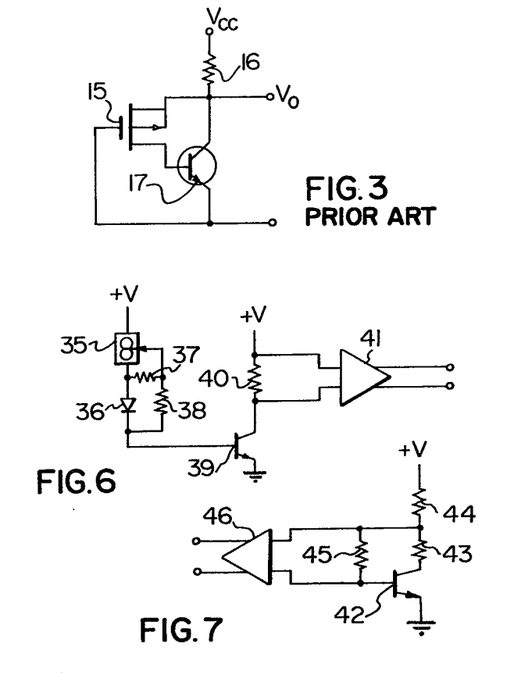
FIG. 3 is a schematic of a prior art circuit for measuring total radiation dose.
FIG. 6 is a schematic diagram of another embodiment of the invention.
FIG. 7 is a portion of schematic diagram of the invention according to a further embodiment.

Turning now to FIG. 3, a prior art circuit for measuring accumulated radiation dose is shown. A MOSFET 15 has its source electrode connected to a constant current source, which is obtained by the series circuit of a high value resistor 16 connected to a power supply Vcc. An output lead Vo is connected to the source.

The drain electrode is connected to the base of an NPN transistor 17, its emitter being connected to the gate of the MOSFET, and its collector being connected to the source of the MOSFET.

The circuit functions to provide a constant current of, e.g., 10 microamperes to the drain electrode of the MOSFET. The gate-source voltage is applied directly to the base-emitter circuit of the bipolar transistor 17, which amplifies it, and applies it to the output lead Vo, which voltage can be detected between that lead and the emitter lead of transistor 17. Consequently as the gate-source threshold voltage changes, this can be measured at the output lead Vo, the measuring device being calibrated in, e.g., rads.

However, the shift in threshold represents a total dosage accumulation, and there is no way to detect the dose rate using this prior art circuit.

FIG. 4 is a simplified schematic of the preferred form of the present invention. A MOSFET 20, preferably of P channel type, has its source connected to a power source such as a battery VD through a resistor 21 of such value that a relatively constant current is provided to the source of the FET. The voltage VD can be e.g. 5-10 volts. The drain of MOSFET 20 is connected to ground, and to its gate through switch 22. The other switched terminal of switch 22 is connected to the supply VD through resistor 21A. The function of switch 22 will be described later.

The source of MOSFET 20 is connected to the input of amplifier 23, the output of which is connected through double pole double throw switch 24 to a differentiating circuit. This circuit can be comprised of resistor 25 in series with capacitor 26 which is connected to the input of operational amplifier 27. The output of operational amplifier 27 is connected to its inverting input through resistor 28 in parallel with capacitor 29. The output of amplifier 27 is connected to a pair of inputs of indicator 30. The other pair of terminals from switch 24 is connected to the same or another pair of terminals of indicator 30. Indicator 30 can include a switch (not shown) which can select either the input directly from switch 24 or the output of amplifier 27 if two pairs of input terminals are used, and applies the detected voltage to a digital display. The display can include a well known analog to digital converter for translating the analog input to a digital output, and a liquid crystal alphanumeric display, for indicating the dose and/or dose rate. The switch 24 thus has one position which indicates dose rate (which measures the output from amplifier 27) and the other position which indicates total dose.

Figure 5:
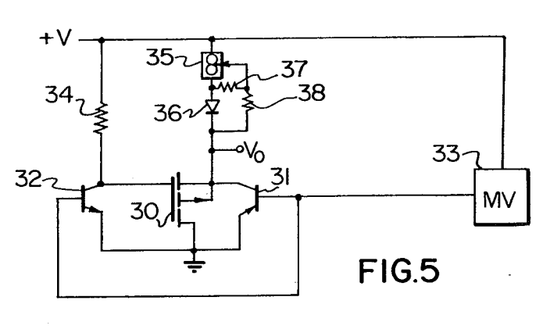
FIG. 5 is a detailed schematic diagram of the first embodiment of the invention.

FIG. 5 is a detailed schematic diagram of the circuit which is connected to the inputs of amplifier 23. A P channel MOS transistor 30 has its source connected to the collector of a PNP bipolar transistor 31 and its drain connected to its emitter. The gate of FET 30 is connected to the collector of an NPN bipolar transistor 32, the emitter of transistor 32 being connected to the drain of FET 30, the drain of FET 30 and the two emitters of the bipolar transistors forming a ground point. The base of transistors 31 and 32 are connected together and to the output of a source of clock pulses such as multivibrator 33.

The collector of transistor 32 is connected through a resistor 34 to a positive supply source +V which has its negative terminal connected to the ground point. The source of FET 30 is connected to a temperature compensated current source, e.g. made up of a current regulator 35 connected through diode 36 to the drain, and regulator 36 being connected to the positive supply terminal +V. Resistors 37 and 38 are connected in series to the opposite terminals of diode 36, and the junction between resistors 37 and 38 are connected to the control input of regulator 35.

A terminal indicated by reference $V_o$ provides the output signal which is to be applied to the input of amplifier 23 in FIG. 4.

In operation, multivibrator 33 should provide positive-going clock pulses, each having a duration typically of 1 second per minute or less, depending on dose rate measurement requirements. When the output signal of multivibrator 33 is low, transistor 32 is non-conductive and the gate of FET 30 is brought up to +V, which, it has been found, makes the device more sensitive during irradiation. During this interval, transistor 31 is conductive, thus short-circuiting the drain-source of the FET.

However, when the multivibrator 33 outputs a positive-going pulse, transistor 32 is conductive, the emitter-collector circuit short-circuiting the gate of FET 30 to ground. Transistor 31 is non-conductive. Therefore the output voltage from Vo provides the threshold drain-source voltage which is dealt with by the following circuit as described earlier with reference to FIG. 4. The indicator, of course, should be the type which holds the voltage value, such as a peak indicator.

Resistor 34 is used for current limiting, and is preferably approximately 16 K ohms. The bipolar transistors are preferably of a type similar to 2N222A (of appropriate polarity type). Typical drain-source current is about 50 microamperes. A multivibrator which is suitable for the circuit is type CD4047, and the current limiter can be type LM134.

FIG. 6 is a circuit for providing an output signal in which the radiation sensitive sensor device is a bipolar transistor, in which the collector current provides an indication of the radiation dosage, assuming that the base current is kept constant. A temperature compensated constant current source such as that described with reference to FIG. 5 is used to supply base current to an NPN transistor 39. The current source includes a circuit comprising current limiter 35, diode 36 and resistors 37 and 38 as described earlier, which circuit is connected to a source +V and the base of transistor 39. The emitter of transistor 39 is connected to ground and its collector is connected to supply source +V through a load resistor 40. An operational amplifier 41 is connected to the opposite terminals of resistor 40. Amplifier 41 corresponds to amplifier 23 in FIG. 4.

In operation, approximately 10 microamperes of base current is supplied by the constant current source, and the resulting collector current is detected across resistor 40, and is passed through amplifier 41 to switch 24 of a circuit such as that described with reference to FIG. 4. Resistor 40 can be above 2 K ohms, and typically approximately 1 milliampere collector current will pass through transistor 39. The collector-emitter voltage can be about 2 volts. As described, the output voltage from amplifier 41 is proportional to the collector current which itself is dependent on the radiation dose passing through transistor 39.

It should be noted that sensitivity of the sensor $h_{FE}$ to radiation is increased with the use of a large emitter periphery to base area ratio.

FIG. 7 is a schematic diagram of the preferred embodiment of the invention in which a bipolar transistor is used as the detection element where the collector current is held constant, and base current is indicated as a measure of the radiation dose. An NPN bipolar transistor 42, with its emitter connected to ground, has its collector connected through series resistors 43 and 34 to a supply source +V. A further resistor 45 is connected between the junction of resistors 33 and 44 and the base of transistor 42. Amplifier 46 has its inputs connected across resistor 45, this amplifier corresponding to amplifier 23 of FIG. 4. The outputs of amplifier 46 are connected to the remainder of the circuit of FIG. 4 which is connected to the output terminals of amplifier 23. Approximately 1 milliampere of collector current is typically drawn, the collector-emitter voltage of the transistor being about 1 volt. Resistor 43 can be 1 k ohm and resistor 44 can be 20 k ohms. Resistor 45 can be 100 k ohms.

The output voltage of amplifier 46 has been found to be proportional to the base current, with the collector current held constant. The base current varies as the radiation dosage, as described earlier.

It should be noted that in all of the above-described embodiments, the analog signal which is to be conducted to the indicator can be applied to a differential amplifier having one input connected to a fixed or variable voltage supply. This establishes a threshold of conduction of the amplifier. The output of the amplifier is connected to an audio alarm, such as an oscillator, to provide an audible alarm if the total dosage or dose ratio is in excess of a predetermined amount.

Figure 8:
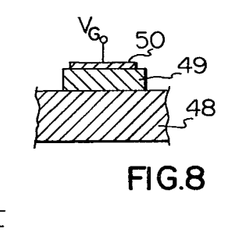
FIG. 8 is a cross-section of an MOS capacitor sensor.

Another form of sensor for use in the present invention is an MOS capacitor. FIG. 8 shows the form of a capacitor which can be used. A conductive silicon substrate 48 has an insulating layer such as silicon dioxide 49 disposed over a defined region of a surface. An upper conductive layer 50, such as a metalization layer 50 is disposed over a defined region of the insulating layer. A D.C. bias voltage VG is applied between conductive layer 50 and conductive substrate 48. While one form of MOS capacitor has been shown, of course other forms of construction will operate satisfactorily, as long as positive charges are trapped in the insulating layer.

Figure 9:
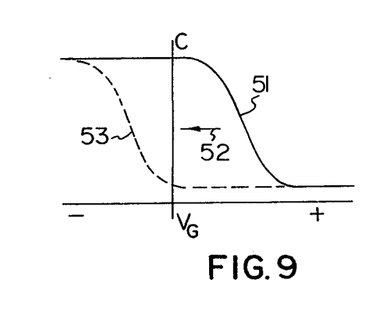
FIG. 9 is a graph of the characteristics of an MOS capacitor sensor under the influence of ionizing radiation.

FIG. 9 shows a graph of capacitance VS applied bias voltage VG across the capacitor with accumulated ionization radiation. Curve 51 is a typical curve showing the capacitor change as VG increases; the capacitance varies from a constant maximum at low and negative VG, through a smooth curve to a minimum constant capacitance at higher positive bias voltages. Capacitance can be measured using an applied A.C. signal, e.g. at 1 MHz.

As the radiation dose increases, the curve shifts to the left as shown by arrow 52. Curve 53 shows the capacitance versus VG characteristics after the capacitor has undergone considerable irradiation. Clearly for a given VG, as the dosage increases, the shifting of the curve causes a drop in capacitance. Once the curve has shifted so that the minimum capacitance is encountered, the bias voltage is lowered, shifting it to the maximum capacitance region of the curve. The capacitance to be measured preferably is in the region of about 100 picofarads.

Figure 10:
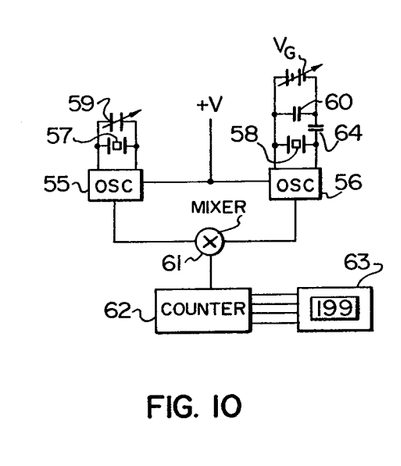
FIG. 10 is a schematic diagram of a further embodiment of the invention.

A preferred embodiment of this invention to measure the capacitance and display the dosage and dose rate is shown in FIG. 10. This type of relative capacitance measurement is faster and can be differentiated more easily than some other circuits to give the dose rate.

A pair of oscillators 55 and 56 are driven by quartz crystals 57 and 58. Trimmer capacitor 59 is connected across crystal 57. The sensor capacitor 60 is connected across crystal 58 (in series with a capacitor 64 to be mentioned later).

The outputs of oscillators 55 and 56 are connected to corresponding inputs of mixer 61, the output of which is connected to the input of counter 62, the output of which is connected to the input of digital display 63.

Variable bias voltage supply $V_G$ is connected in parallel with sensor capacitor 60.

In operation, the bias voltage is varied to provide a minimum reading on display 63. Trimmer capacitor 59 is then adjusted so that the output frequencies of oscillators 55 and 56 are the same. With the two output signal frequencies identical, which signals are applied to mixer 61, there is no beat frequency resulting at the output of mixer 61, and the display 63 reads zero.

As capacitor 60 becomes irradiated, the frequency of oscillator 56 shifts due to the capacitance of capacitor 60 decreasing. With the frequency of oscillator 56 shifting relative to oscillator 55, a beat frequency results at the output of mixer 61, which is applied to counter 62 and results in a reading on display 63. The reduction in capacitance of capacitor 60, a shift in frequency and reading on the display, directly results from the radiation dosage which is encountered.

In order to zero the scale, either capacitor 59 or $V_G$ is readjusted, depending on whether the full maximum to minimum capacitance range is required.

The above-described type of measurement is useful at oscillator frequencies of about 1 megahertz or higher.

If $V_G$ is held constant, the MOS capacitance of capacitor 60 decreases as radiation dose increases. Above a certain dose the capacitance does not change as described with reference to FIG. 9, the minimum capacitance having been reached. In order to repeat the measurement, $V_G$ is adjusted. The voltage is reduced, and under some circumstances $V_G$ could be reversed in polarity to negative voltage.

While $V_G$ has to be adjusted in the negative direction to bring the minimum capacitance back to the maximum capacitance, in practice the dosimeter is operated similarly to other instruments, in which the instrument is zeroed, then read, then zeroed, then read, etc.

While the circuit of FIG. 10 indicates a total dosage, a rate of dosage indication can be provided. The output of mixer 61 is applied to a filter having a linear skirt slope, and the output of the filter applied to a rectifier circuit for conversion to DC. Accordingly as the beat frequency changes, the DC output voltage changes. The output of the rectifier circuit is applied to an operational amplifier such as operational amplifier 23 of FIG. 4. The resulting differentiatial signal provides an indication of dose rate.

Alternatively the output of oscillator 56 can be connected to the linear filter. In this case mixer 61, oscillator 55, etc. are not required for dose rate measurement, since the output frequency of oscillator 56 varies with radiation dosage passing through MOS capacitor 60.

The circuits described above are suitable for measuring dose rates from less than 1 rad per hour to $10^8$ rads per hour. For a dose rate of 1 rad per hour, the time constant of the differentiator described with reference to FIG. 4 should be about 200 milliseconds maximum. For dose rates of greater than 100 rads per hour, the time constant of the differentiator should be about 1 milliseconds. For very high dose rates, such as those approaching $10^8$ rads per hour, the voltage input from the sensor such as FET 20 should be limited.

The dosimeter circuits noted above, being direct reading and continuous can be used both as personnel dosimeters or in instruments. For example, in FIG. 11 a wristwatch form of dosimeter is shown. A replaceable FET, bipolar transistor or MOS capacitor type sensor 68 is plugged into the circuit at the front face of watch case 69. A display 70 is located to be read through the front of the watch case, and an audio sounder 71 such as those typically used in wristwatch alarms is also located in watch case 69. The circuitry is hidden within the watch case 69. Pushbuttons 72 are made accessible at the front or side of the watch case, e.g. for switching the circuit to the cumulative dose or dose rate modes of operation (i.e. operating switch 24), and also to turn on a threshold circuit which operates an audio alarm as described earlier.

Figures 11, 12:
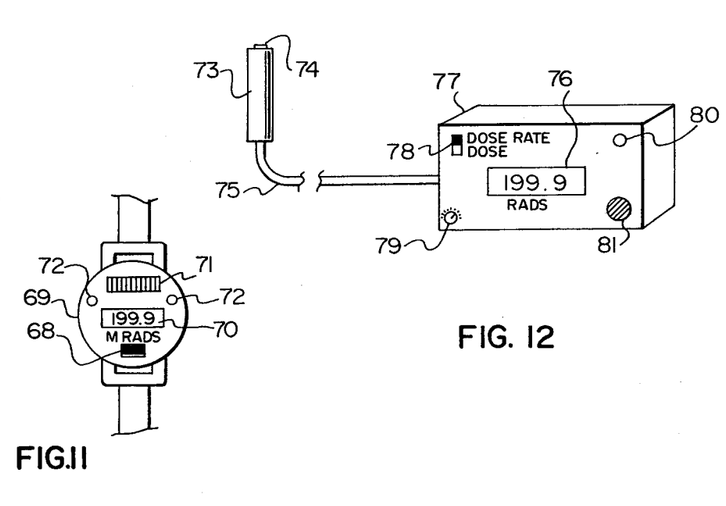
FIG. 11 is a pictorial view of one physical form of the invention, on the same sheet as FIG. 4.
FIG. 12 is a pictorial view of a second physical form of the invention, on the same sheet as FIG. 4.

In the case where cumulative dose measurements are made, and the wearer is not allowed to read the scale 70, this display may be replaced by an output connector. The dose would then be read by connecting the dosimeter to a separate display device. This mode of operation finds application in health fields where Federal or other health authorities control the reading of such devices.

FIG. 12 shows the physical implementation of an instrument type dosimeter. A probe 73 has a plug in sensor 74 as a replaceable unit at its tip. The circuitry described earlier can be housed within probe 73, the power supply, control and display signal wires being connected thereto via a cable 75. A display 76 is contained within an instrument case 77, and is made visible through a window in one side. A switch 78 for switching the circuit to indicate total dosage or dose rate is located at the front of the instrument case, and a control 79 for setting an audio or other alarm threshold is also preferably provided. If desired, all of the circuitry connected to the output of amplifier 23 (FIG. 4), and a power supply can be contained within instrument case 77. Sensor 74 can be connected by any means such as plug terminals, spring contacts, etc. A flashing light alarm 80 and audio alarm 81 can be located at the front of the instrument case.

The wristwatch form of the circuit is believed to be particularly useful for personnel dosimetry, such as in industrial, hospital, atomic power plant environments, etc. The probe form of dosimeter is expected to be particularly useful to measure radiation therapy machine outputs and to be used internally within patients undergoing radiation therapy.

It is believed that the dosimeter described is a significant advance in the art of dosimetry devices. The device is very small and for the first time can be implemented in a form which is direct reading, light and small enough to be carried without constriction by workers, and provides means for a warning once a dosage rate or accumulated threshold has been exceeded.

A person skilled in the art understanding this invention may now conceive of other embodiments or may make design changes, utilizing the principles of this invention. All are considered to be within the sphere and scope of the invention as defined in the claims appended hereto.

I claim:

1. A direct reading dosimeter comprising:
   (a) a semiconductor sensor including a semiconductor substrate, an insulating layer defined a predetermined area disposed over the substrate for trapping positive charge under the influence of ionizing radiation,
   (b) means for applying a current to the substrate,
   (c) means for sensing the voltage across the portion of the substrate underlying the insulating layer,
   (d) means for differentiating the sensed voltage, and
   (e) means for displaying the differentiated voltage as a dose rate.

2. A direct reading dosimeter comprising:
   (a) an MOS device, including a source, drain and gate, the gate being insulated by an insulating layer of a kind which traps positive charge under the influence of ionizing radiation,
   (b) means for applying a constant current through the source-drain circuit of the transistor,
   (c) means for switching the gate between a source of positive and negative bias sufficient to turn the source-drain circuit off and on,
   (d) means for detecting a voltage across the source and drain, and
   (e) means for indicating the detected voltage.

3. A dosimeter as defined in claim 2, in which the means for detecting includes means for differentiating the voltage across the source and drain, and for presenting the differentiated voltage to the indicating means.

4. A dosimeter as defined in claim 2, including means for switching the detected voltage directly or through a differentiating circuit to the indicating means, whereby the indicating means is caused to correspondingly display total dose or dose rate of said radiation.

5. A dosimeter as defined in claim 2, 3 or 4 in which the indicating means is comprised of a digital display calibrated in radiation units.

6. A dosimeter as defined in claim 2, 3 or 4 in which the indicating means is comprised of an alarm having a predetermined voltage threshold of operation.

7. A dosimeter as defined in claim 2, 3 or 4 in which the MOS device is a P channel type field effect transistor.

8. A dosimeter as defined in claim 2, 3 or 4 in which the MOS device is a P channel type field effect transistor, including means for applying the constant current to the source, the gate switching means being comprised of means for switching the gate between said source of positive bias and the drain at predetermined sampling intervals, said indicating means being comprised of a digital display calibrated in radiation units.

9. A dosimeter as defined in claim 2, 3 or 4 in which the MOS device is a P channel field effect transistor, further including means for applying a constant current of about 10 microamperes to the source, the gate switching means being comprised of means for switching the gate between said source of positive bias and the drain at predetermined sampling intervals, said indicating means being comprised of a digital display calibrated in radiation units.

10. A direct reading dosimeter comprising:
   (a) a bipolar transistor having a collector, emitter and base,
   (b) means for applying a constant current to the base,
   (c) a load connected in an emitter-collector circuit of the transistor,
   (d) means for applying a current through said emitter-collector circuit,
   (e) means for detecting either the current through the emitter-collector circuit or the voltage across the load to provide an output signal, and
   (f) means for indicating the output signal.

11. A direct reading dosimeter comprising:
   (a) a bipolar transistor having a collector, emitter and base,
   (b) means for applying a constant current to the base,
   (c) a load connected in an emitter-collector circuit of the transistor,
   (d) means for applying a current through said emitter collector circuit,
   (e) means for detecting the voltage across the load to provide an output signal, and
   (f) means for indicating the output signal.

12. A direct reading dosimeter comprising:
   (a) a bipolar transistor having a collector, emitter and base,
   (b) a load connected to the emitter, to form a collector-emitter circuit,
   (c) means for applying a constant current to the collector-emitter circuit,
   (d) means connected in a base-emitter circuit for applying a base direct current to the transistor,
   (e) means for detecting one of the base current, load current or load voltage to provide an output signal, and
   (f) means for indicating the output signal.

13. A dosimeter as defined in claim 10, 11 or 12 in which the transistor has a large emitter periphery to base area ratio.

14. A dosimeter as defined in claim 10, 11 or 12 further including means for differentiating the output signal prior to indication thereof.

15. A dosimeter as defined in claim 10, 11 or 12 including means for switching the output signal directly or through a differentiating circuit to the indicating means, whereby the indicating means is caused to correspondingly display total dose or dose rate of said radiation.

16. A direct reading dosimeter comprising:
   (a) an MOS capacitor including a substrate, an insulating layer disposed over the substrate, and a conductive layer disposed over the insulating layer,
   (b) means for applying a bias voltage across the capacitor,
   (c) means for applying a high frequency signal through a load across the capacitor,
   (d) means for detecting the voltage across the capacitor during or following irradiation of the capacitor by ionizing radiation,
   (e) means for differentiating the detected voltage prior to indication thereof, and
   (f) means for indicating said detected voltage.

17. A direct reading dosimeter comprising:
   (a) an MOS capacitor including a substrate, an insulating layer disposed over the substrate, and a conductive layer disposed over the insulating layer,
   (b) means for applying a bias voltage across the capacitor,
   (c) means for applying a high frequency signal through a load across the capacitor,
   (d) means for detecting the voltage across the capacitor during or following irradiation of the capacitor by ionizing radiation,
   (e) means for differentiating the detected voltage prior to indication thereof,
   (f) means for indicating said detected voltage, and
   (g) means for switching the detected voltage directly or through a differentiating circuit to the indicating means, whereby the indicating means is caused to correspondingly display total dose or dose rate of said radiation.

18. A direct reading dosimeter comprising:
   (a) an MOS capacitor for exposure to ionizing radiation,
   (b) means for applying a bias voltage across the capacitor,
   (c) a first oscillator connected to the capacitor whereby the frequency of the oscillator is determined by the capacitance of the capacitor,
   (d) means for detecting the frequency of the oscillator, and
   (e) means for displaying the detected frequency of the oscillator as an ionizing radiation dosage indication.

19. A dosimeter as defined in claim 18, including means for converting the frequency of the oscillator into an analog signal having a voltage which varies with said frequency, means for differentiating said analog signal, and for applying said differentiated signal to the displaying means.

20. A direct reading dosimeter as defined in claim 18, including a second oscillator, a trimmer capacitor connected to the second oscillator for varying the frequency of the second oscillator, the detecting means including mixer means for receiving output signals of the first and second oscillators and a counter connected to the output of the mixer, the displaying means being connected to the output of the counter, and further including means for adjusting said bias voltage.

21. A direct reading dosimeter comprising:
   (a) a semiconductor device including an insulating layer for trapping positive charges upon said device being irradiated by ionizing radiation, and having at least one electrical parameter varying as a result of said trapped charge,
   (b) means for applying a signal to said device whereby said signal is varied as a result of the variation of said parameter,
   (c) means for detecting said varied signal, and
   (d) means for displaying said detected varied signal.

22. A dosimeter as defined in claim 21, further including means for differentiating said varied signal prior to display.

23. A dosimeter as defined in claim 21 or 22 in which the applied signal is a constant current.

24. A direct reading dosimeter comprising:
   (a) a watchcase,
   (b) a digital display on the front face of the watchcase, (c) an audio alarm triggered by a signal having amplitude greater than a predetermined threshold contained within the watchcase,
(d) a first and second manually operated switches fixed within the watchcase for external control,
(e) a semiconductor sensor substantially exposed to ambient ionizing radiation and disposed adjacent the front face of the watchcase, including a semiconductor substrate, an insulating layer disposed over the substrate, and a conductive layer disposed over the insulating layer, said insulating layer being of a type which traps positive charge under the influence of ionizing radiation,
(f) means within the watchcase for applying a bias current to the semiconductor sensor sufficient to offset at least part of any buildup of said positive charge,
(g) means within the watchcase for detecting change in a conductive parameter of said sensor with buildup of said positive charge under the influence of said radiation, and for generating an output signal dependent thereon,
(h) a differentiating circuit within the watchcase,
(i) said output signal being applied via one pair of contacts of one of said switches to the digital display, and via a second pair of contacts of said one of said switches through the differentiating circuit to the digital display,
(j) said output signal also being applied via a pair of contacts of the other of said switches to the audio alarm.

* * * * *